A. COLEMAN.
MOTOR VEHICLE.
APPLICATION FILED SEPT. 23, 1913.
1,131,678. Patented Mar. 16, 1915
3 SHEETS—SHEET 1.
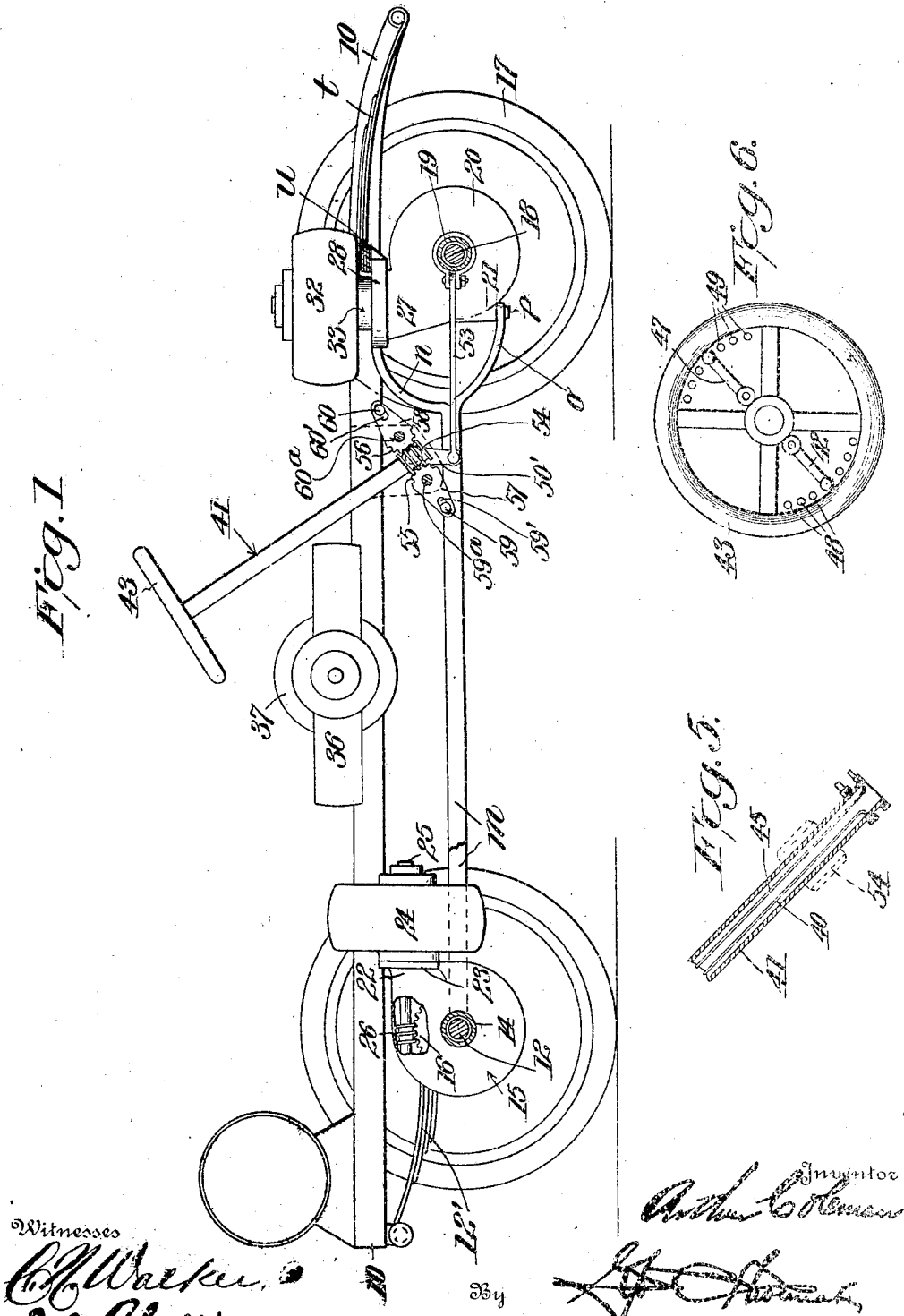

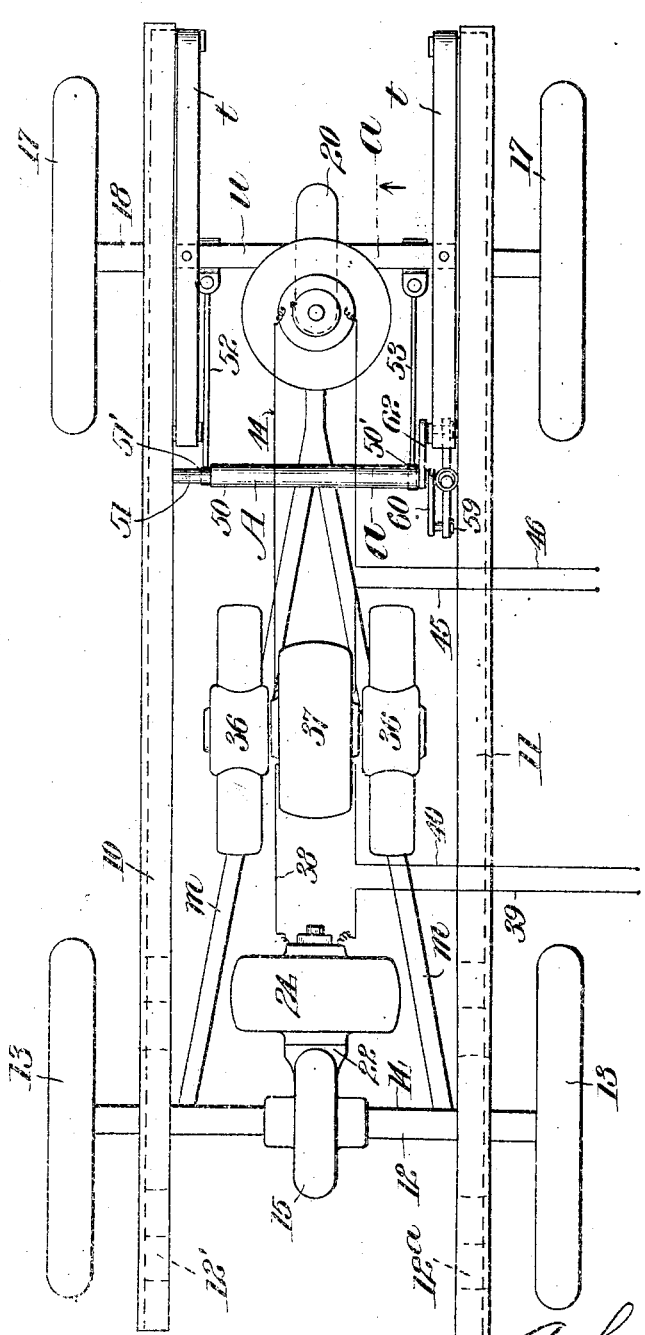

A. COLEMAN.
MOTOR VEHICLE.
APPLICATION FILED SEPT. 23, 1913.
1,131,678.
Patented Mar. 16, 1915.
3 SHEETS—SHEET 3.
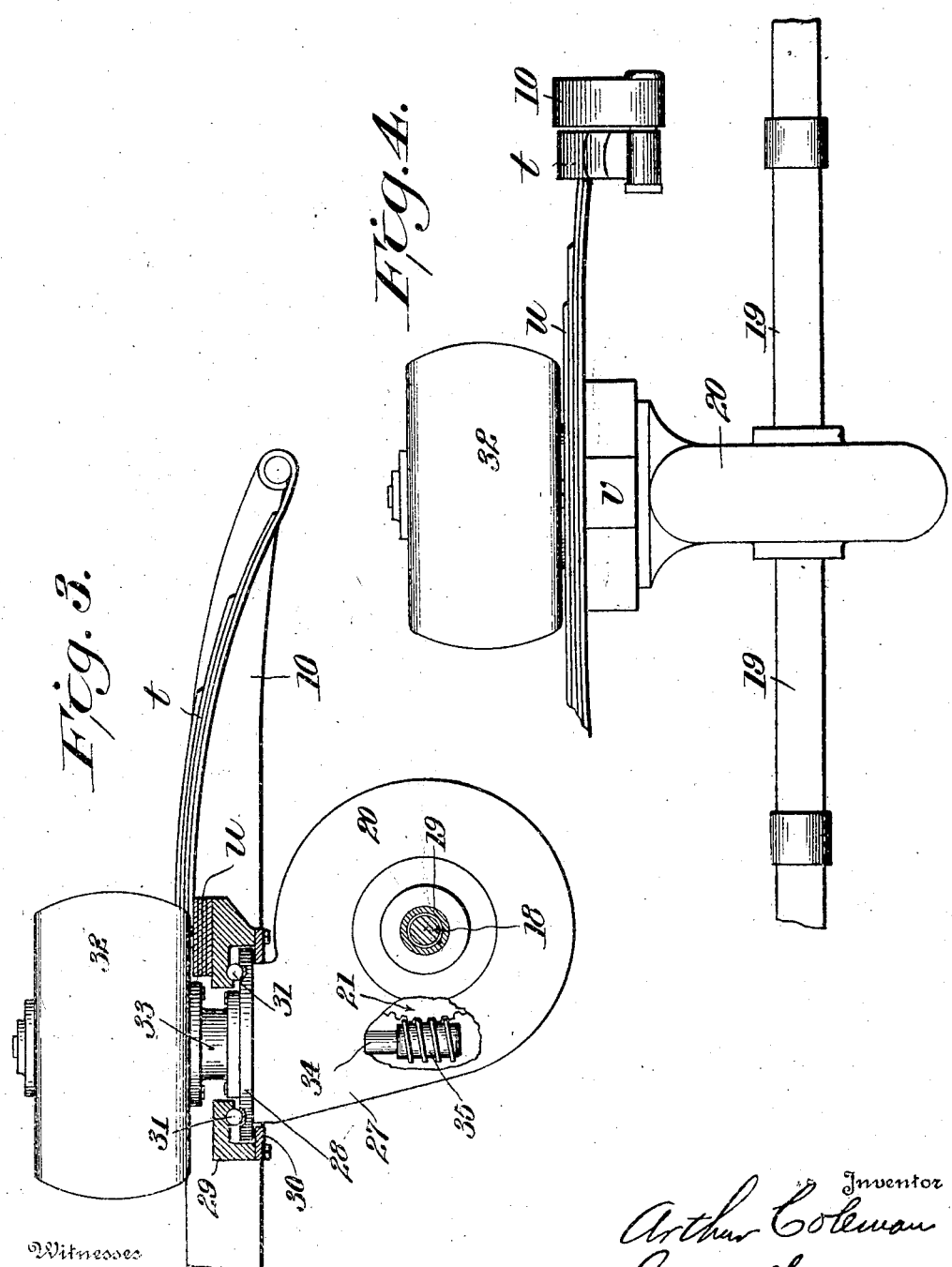

UNITED STATES PATENT OFFICE.

ARTHUR COLEMAN, OF CARMEN, OKLAHOMA.

MOTOR-VEHICLE.

1,131,678. Specification of Letters Patent. Patented Mar. 16, 1915.

Application filed September 23, 1913. Serial No. 791,416.

*To all whom it may concern:*

Be it known that I, ARTHUR COLEMAN, a citizen of the United States, residing at Carmen, in the county of Alfalfa and State of Oklahoma, have invented certain new and useful Improvements in Motor-Vehicles, of which the following is a specification.

This invention relates to motor vehicles.

One object is to provide an electrically driven motor vehicle capable of generating its own electricity through the instrumentality of a generator operated by a gas or other engine carried by the vehicle and coupled up in any suitable manner with the generator, there being an electric motor adjacent the front axle and another electric motor adjacent the rear axle, with the motors having suitable electrical connections with the generator and operable so that either one or the other of the motors, or both, simultaneously, may be put into operation to drive each of the four ground wheels of the vehicle with equal power.

Another object resides in the provision of a motor vehicle embodying among other characteristics front and rear axles each carrying a differential mechanism operatively connected with which is an electric motor with the electric motors connected up by means of suitable electrical connections with a generator driven by a suitable engine, whereby the electrical fluid generated may be supplied to the motors to operate the differential mechanisms and thereby drive the vehicle at both front and rear, all under the control of the operator of the vehicle.

A still further object is to provide a motor vehicle with a front axle adapted to be turned bodily in either direction for steering purposes, in combination with means whereby the front wheels only may be driven when steering the vehicle so that, especially when the pavement is wet, there will be less danger of the vehicle skidding than when the rear wheels only are driven or when the front and rear wheels are both driven.

It is a still further object of the present invention to provide a motor vehicle wherein the front axle is capable of turning bodily on a fifth wheel operated in any suitable manner and wherein the front axle is connected up with the rear axle by means of a reach bar capable of permitting normal alinement of the front and rear axles and yet permitting of a free and easy swinging of the entire front axle when steering the vehicle.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a side elevation of the invention. Fig. 2 is a top plan view. Fig. 3 is a transverse sectional view on the line *a—a* of Fig. 2. Fig. 4 is a fragmentary front elevation of the front axle, the fifth wheel and the front motor. Fig. 5 is a detail fragmentary sectional view through the lower portion of the steering post. Fig. 6 is a top plan view of the steering wheel.

Referring now more particularly to the accompanying drawings, the reference characters 10 and 11 indicate the side sills of the chassis of a truck, runabout, touring car, or other type of car or motor vehicle. The rear of the chassis is supported in any suitable manner by the rear axle 12 between which and the body of the vehicle are interposed the side springs 12′ and 12ª. On the axle 12 are disposed the rear ground wheels 13. This rear axle is preferably mounted in a casing 14 including the differential mechanism casing 15, as usual. Any suitable type of differential mechanism may be employed within the casing 15, but I preferably employ the differential mechanism illustrated, described and claimed in my Patent No. 1,061,450, dated May 13, 1913. In any event, the differential mechanism includes a gear 16 for a purpose presently explained.

The front axle 18 of the vehicle is preferably solid and inclosed in a casing 19 which includes the differential mechanism 20 which is designed to confine within it a differential mechanism substantially the same as the differential mechanism inclosed in the aforesaid casing 15. The front differential mechanism, like the rear differential mechanism, includes a gear 21 for a purpose presently explained. It will be noted that this front axle is preferably composed of two sections connected together at their inner ends by the differential mechanism and, as will be explained hereinafter, these two sections of the front axle are maintained always in horizontal alinement so that the front axle as a whole may be turned bodily for steering purposes, as will be explained.

The casing 15 of the rear differential mechanism is preferably provided with a hollow lug 22 which terminates in an annular flange 23. To this flange 23 there is bolted or otherwise secured the casing of an electric motor 24 whose operating shaft 25 projects through the flange 23, the lug 22 and into the casing 15 of the rear differential mechanism. That end of said motor shaft 25 which projects into the casing 15 is provided with a worm gear 26 adapted to mesh with the aforesaid gear 16 of the rear differential mechanism so as to drive the rear wheels upon operation of the motor 24.

Formed on the casing 20 of the front differential mechanism is a hollow lug 27 provided with an annular flange 28 forming the rotatable part of a fifth wheel. This rotatable part of the fifth wheel is adapted to coöperate with a companion fixed fifth wheel member 29. This member 29 carries a ring 30 designed to underlie the rotatable fifth wheel member 28. These fifth wheel members 28 and 29 have opposing grooves formed therein to provide a raceway to receive the bearing balls 31 designed to reduce friction and thereby facilitate rotation of the rotatable part of the fifth wheel and consequently enable easy and free turning of the front axle and the wheels carried thereby.

Projecting upwardly from the upper face of the rotatable part 28 of the fifth wheel and projecting through the fixed fifth wheel member 29 is a support 33 to which is bolted or otherwise secured an electric motor 32. The lower end of the drive shaft 34 of this front electric motor 32 extends loosely through said support 33 and through the fifth wheel and hollow lug 27 into the casing 20 and at its end which projects into the casing 20 it is provided with a worm gear 35 adapted to mesh with the aforesaid gear 21 of the front differential mechanism for the purpose of driving the front wheels.

It will thus be seen that I provide two electric motors, one for driving the front wheels and one for driving the rear wheels. The four ground wheels of the vehicle are therefore driven with equal power and it will be understood that the electric motors used for this purpose may be of any desired size and of any well known type and provided with the necessary appurtenances for the performance of the functions outlined for them.

To drive the electric motors 24 and 32 any suitable engine may be employed. I prefer to use a gas engine of the two, four or six cylinder variety. This gas engine is indicated at 36 and is illustrated as of the four cylinder type. To its crank shaft I couple up with it in any suitable manner an electric generator 37 having all of the appurtenances necessary for the generation of electricity incident to operation of the engine. The engine may be started in any suitable manner, as for instance, by hand or a self-starting contrivance. The operation of the gas or other engine 36 operates the generator 37 to generate electricity for supply to the electric motors 24 and 32 to operate the motors and thereby drive the wheels of the vehicle to propel the latter.

The generator employed by me may be of any desired type and of any suitable size. It may be connected up with the front and rear motors through the instrumentality of any suitable electrical connections or appurtenances capable of establishing proper electrical connection between it and the motors. As shown in the accompanying drawings, the generator is connected up to the rear motor by means of the wires 38, 39 and 40. The wires 39 and 40 preferably extend up through the hollow steering post 41 and are connected in any well known manner to the steering wheel 43 and the controlling lever 42 on the steering wheel.

The front electric motor 32, as shown in the accompanying drawings, may be connected up with the generator 37 by means of the wires 44, 45 and 46. The wires 45 and 46 preferably extend up through the hollow steering post 41 for connection with the steering wheel and the controlling lever 47. These controlling levers 42 and 47 are preferably arranged one on top of the other but they may be arranged in any suitable manner. This controlling mechanism may be of any well known type with the levers coöperating with terminals 48 and 49 on the steering wheel for the purpose of connecting the wires 39 and 40 and 45 and 46 to establish electrical communication between the generator and the respective motors. Therefore, one motor at a time may be connected electrically with the generator 37, or both may be connected with the generator electrically at the same time, as may be desired, and by virtue of the controlling mechanism being of common type, the control of the motor should be readily understood.

The chassis at the rear is supported on two points by the aforesaid two side springs 12' and 12ᵃ. At the front of the vehicle the chassis preferably has one point of suspension. For instance, two side springs $t$ may be connected to the side sills of the chassis. Intermediate the ends of these side springs $t$ there may be connected the ends of a transverse spring $u$ which is preferably pivoted intermediate its ends on the lug $v$ on the non-rotatable part of the fifth wheel of the vehicle. It will thus be seen that I provide a three-point suspension of the chassis.

I do not wish to limit myself with reference to the particular manner of steering the vehicle. One form of means for this purpose and the preferred mechanism employed as illustrated in the accompanying drawings, wherein there is disclosed a countershaft A consisting preferably of a rotatable sleeve 50 and a rotatable telescoping inner solid part 51. This countershaft A is journaled in the chassis in any suitable manner. The solid part or section of the countershaft is preferably provided with a crank arm 51' to which one end of a rod 52 is preferably connected with the opposite end of said rod connected in any suitable manner to the front axle 18. The sleeve 50 has a crank arm 50'. A rod 53 has one of its ends connected to this crank arm 50' with its opposite end connected in any suitable manner to the front axle 18.

As stated hereinbefore, the front axle is preferably solid, consisting of two sections whose inner ends are connected to the front differential mechanism and the front wheels are mounted directly on these two sections, whereby there is obviated the employment of the usual knuckle or universal joint connections between the shaft proper and the stubs which usually carry the front wheels. These axle sections are maintained always in alinement so that the front axle is swung as a whole. That is to say, when steering the vehicle, it is swung throughout its length. The sectional countershaft A, alluded to above, has its parts so arranged that they will be rotated in opposite directions to effect swinging of the front axle. To swing these sectional parts 50 and 51 of the countershaft A in opposite directions to steer the vehicle, the solid internal part 51 of the countershaft A is provided with a crank arm 61. The sleeve 50 of said countershaft is provided with a crank arm 62. These crank arms 61 and 62 are rigidly connected to their respective parts and at their outer ends are provided with studs 59 and 60 adapted to project through the slots 59' and 60' of the segmental members 57 and 58. These segmental members 57 and 58 are preferably pivotally mounted and may be pivoted to any suitable part of the chassis or to any part carried thereby. For purpose of convenience, these segmental members 57 and 58 are shown mounted on bearings 59ᵃ and 60ᵃ and they are provided at their inner ends with teeth 55 and 56 adapted to mesh normally with the worm gear 54 carried by the steering post 41 adjacent the lower end of the latter. The result is that, upon manipulating the steering wheel and turning the steering post 41 in either direction, the parts 50 and 51 of the countershaft A are rotated in opposite directions and consequently effect a turning of the front wheels to the right or left, according to the direction of turn of the steering wheel on the post 41.

The front and rear axles are preferably connected by a reach bar, including the legs m and arms n and o. The arm n is preferably connected to the fixed part of the fifth wheel while the arm o is preferably connected on the stud p of the front differential mechanism. The legs m of the reach bar are preferably connected to the rear axle adjacent the wheels, as shown. Thus, the front and rear axles are connected together, as is the custom, and yet, by virtue of my peculiar form of reach bar and my particular connection of the same to the vehicle, the front axle, although straight, and although it carries the wheels without the use of universal joint connections, is not hindered in the performance of its steering or turning function.

There are times when the road is wet or in such other condition as to cause skidding of motor vehicles. When the power is driven solely from the rear wheels and an effort is made to turn the vehicle, skidding frequently follows, causing damage and sometimes injury to occupants of the vehicle. My invention embodies, among other characteristics, means whereby the vehicle is driven not only from the rear wheels but the front wheels may do all the driving or pulling. At times when there is danger of skidding, if the rear wheels are released from their driving function and the driving or pulling is confined solely to the front wheels, steering of the vehicle around a corner or curve is rendered less dangerous and the turn made freely and easily.

What is claimed is:—

1. In a motor vehicle, a chassis, front and rear axles, a differential mechanism connected to each axle, a casing for each differential mechanism, a motor connected directly to and supported solely by each casing, and means to drive said motors.

2. In a motor vehicle, a chassis, front and rear axles, a differential mechanism connected to each axle, a casing for each differential mechanism, a motor connected to and supported by each casing, each motor being free of the chassis and having its drive shaft extending through the respective differential mechanism casing and coöperatively connecting with the respective differential mechanism, and means to drive said motors.

3. In a motor vehicle, a chassis, front and rear axles, a differential mechanism connected to each axle, a casing for each differential mechanism, each casing having a hollow lug provided with an annular flange, a motor connected to said flange of each casing and thereby supported within the chassis, each motor having its drive shaft extending through the hollow lug of the respective casing and operatively connected to the respective differential mechanism, and means for driving said motors.

4. In a motor vehicle, a chassis, front and rear axles, a differential mechanism connected to each axle, a casing for the front differential mechanism which has a hollow lug provided with an annular flange, a fifth wheel interposed between the differential mechanism casing of the front axle and the body of the vehicle, the aforesaid flange of the hollow lug of the front casing forming part of said fifth wheel, a reach bar having connection with the rear axle and at its front end having connection with the fifth wheel and with the front differential mechanism casing, and means for driving the differential mechanisms.

5. In a motor vehicle, a chassis, front and rear axles, a differential mechanism connected to each axle, a casing for each differential mechanism, a motor connected to and supported solely by each casing, an electric generator having electrical connection with said motors to drive the same, an engine to drive and operate the electric generator, and a controlling means whereby the electric motors may be operated separately or together.

6. In a motor vehicle, a chassis, front and rear axles, a differential mechanism connected to each axle, a casing for each differential mechanism, an electric motor connected to and supported by each casing, a fifth wheel interposed between the front differential mechanism casing and the front electric motor, springs connected to the chassis at the front end thereof, and a transversely disposed spring having connection with said wheel and also with the first-mentioned springs.

7. In a motor vehicle, a chassis, an axle, ground wheels carried by the axle, a differential mechanism on the axle, a casing for the differential mechanism, a motor supported on the differential mechanism casing and free of direct connection with the chassis, and provided with a vertically disposed drive shaft which extends within said casing, and a worm gear on the lower end of said shaft in mesh with the differential mechanism.

8. In a motor vehicle, an axle, a differential mechanism connected to the axle, a casing for the differential mechanism provided with an outwardly extending hollow projection located above the plane of the axle, a motor connected to the hollow projection and supported solely by its connection with the hollow projection of the casing and provided with a drive shaft which extends through said hollow projection into the casing, and an operative connection between the drive shaft and the differential mechanism.

In testimony whereof I affix my signature in presence of two witnesses.

ARTHUR COLEMAN.

Witnesses:
 JOHN H. SIGGERS,
 GEO. C. SHOEMAKER.